US005457815A

United States Patent [19]

Morewitz, II

[11] Patent Number: 5,457,815

[45] Date of Patent: Oct. 10, 1995

[54] RBDS SCAN, IDENTIFY AND SELECT RECEIVING METHOD AND SYSTEM

[76] Inventor: Herbert Morewitz, II, 7 Conway Rd., Newport News, Va. 23606

[21] Appl. No.: 180,614

[22] Filed: Jan. 13, 1994

[51] Int. Cl.[6] .................... H04B 17/02

[52] U.S. Cl. .................... 455/161.1; 455/184.1; 455/158.1; 455/133

[58] Field of Search .................... 455/161.1, 161.2, 455/161.3, 184.1, 186.2, 186.1, 154.1, 154.2, 157.1, 157.2, 158.1, 158.2, 158.3, 158.4, 185.1, 152.1, 132, 133, 134, 135, 45, 142, 143

[56] References Cited

U.S. PATENT DOCUMENTS

| | | | |
|---|---|---|---|
| 4,887,308 | 12/1989 | Dutton | 455/156 |
| 5,249,303 | 9/1993 | Goeken | 455/33.4 |
| 5,303,400 | 4/1994 | Mogi | 455/186.1 |

FOREIGN PATENT DOCUMENTS

| | | | |
|---|---|---|---|
| 0060115 | 3/1989 | Japan | 455/152.1 |

*Primary Examiner*—Edward F. Urban
*Assistant Examiner*—Lee Nguyen
*Attorney, Agent, or Firm*—Peter J. Van Bergen

[57] ABSTRACT

An RBDS compatible receiving method and system are provided. A broadcast receiver is tuned to a selected broadcast frequency. A first of two RBDS receivers operates in a locked mode to receive RBDS data associated with the selected broadcast frequency. Simultaneously, the second of the two RBDS receivers operates in a scanning mode to scan RBDS data associated with all broadcast frequencies. Match criteria corresponding with one or more categorical portions of RBDS data is compared with the RBDS signal associated with each broadcast frequency scanned by the RBDS receiver operating in the scanning mode. Each time a match occurs, the broadcast receiver can optionally be switched from the selected frequency to the broadcast frequency on which the match occurred while the first and second RBDS receivers switch operating modes.

14 Claims, 2 Drawing Sheets

RBDS SCAN, IDENTIFY AND SELECT RECEIVING METHOD AND SYSTEM

FIELD OF THE INVENTION

The invention relates generally to the Radio Broadcast Data System (RBDS), and more particularly to a receiving method and system that is capable of receiving a particular radio broadcast frequency (e.g., FM) that includes an RBDS data signal while simultaneously: 1) scanning RBDS signals associated with other radio broadcast frequencies, 2) identifying one or more of the other broadcast frequencies based on particular portions of their associated RBDS signals that are of interest to a user, and 3) providing the user with the option to selectively re-tune the receiving system to any one of the identified broadcast frequencies.

BACKGROUND OF THE INVENTION

Recently, the Radio Broadcast Data System (RBDS) has been introduced in the United States. RBDS is a means by which radio broadcasters can transmit digital data along with their broadcast signal to "smart" receivers capable of performing a variety of automatic functions. Briefly, the RBDS signal is located on a subcarrier frequency of 57 kHz. The data rate is 1187 bits per second and the subcarrier injection level is low (i.e., approximately 3 percent). In this way, no harmful interference appears in the programming carried by the broadcast.

The RBDS digital data format is organized as a plurality of categories of codes which may be used by RBDS receivers to trigger specific functions. A few of the categories of codes are as follows:

- Clock Time and Date Code is time and date information continuously available in the RBDS signal for updating the time display in the receiver's clock;
- Program Identification Code is information relating to the radio broadcaster's station;
- Traffic Program Code identifies the radio broadcaster as one providing traffic information;
- Traffic or Emergency Announcement Code is used to interrupt current programming with a particular traffic or emergency announcement;
- Program Type Code is used to identify a particular station's current format (e.g., news, talk, rock, etc.); and
- Radio Text Code is used to transmit text data along with programming carried by the broadcast signal.

In light of this new broadcast capability, there exists an immediate need for RBDS receivers that can scan, identify and select a radio program using listener specified radio broadcast RBDS codes.

SUMMARY OF THE INVENTION

Accordingly, it is an object of the present invention to provide an RBDS compatible receiving method and system that is capable of receiving a particular radio broadcast frequency while simultaneously scanning RBDS signals associated with other radio broadcast frequencies, identifying one or more of the scanned broadcast frequencies based on particular portions of the associated RBDS signals that are of interest to a user, and provide the user with the option to selectively re-tune the receiving system to any one of the identified broadcast frequencies.

Another object of the present invention is to provide an

RBDS compatible receiving system that is capable of storing RBDS transmitted information.

Other objects and advantages of the present invention will become more obvious hereinafter in the specification and drawings.

In accordance with the present invention, an RBDS compatible receiving method and system are provided. It is assumed that the system will operate in a broadcast frequency spectrum in which each of a plurality of broadcast frequencies has a subcarrier frequency for carrying the RBDS type digital signal. A broadcast receiver is tuned to a selected broadcast frequency in the frequency spectrum. The first of two RBDS receivers operates in a locked mode to receive the RBDS subcarrier frequency associated with the selected broadcast frequency. Simultaneously, the second of the two RBDS receivers operates in a scanning mode to scan the RBDS subcarrier frequency associated with each broadcast frequency in the spectrum. Match criteria corresponding with at least one categorical portion of each RBDS type digital signal is compared with the RBDS type digital signal associated with each broadcast frequency scanned by the RBDS receiver operating in the scanning mode. Each time a match occurs between the match criteria and the categorical portion associated with one of the broadcast frequencies being scanned, a match signal is generated. In response to the match signal, the broadcast receiver can optionally be switched from the selected frequency to the broadcast frequency on which the match occurred. Upon switching, the first and second RBDS receivers switch modes such that the RBDS receiver operating in the locked mode switches to the scanning mode and vice versa.

DETAILED DESCRIPTION OF THE INVENTION

Figure 1:
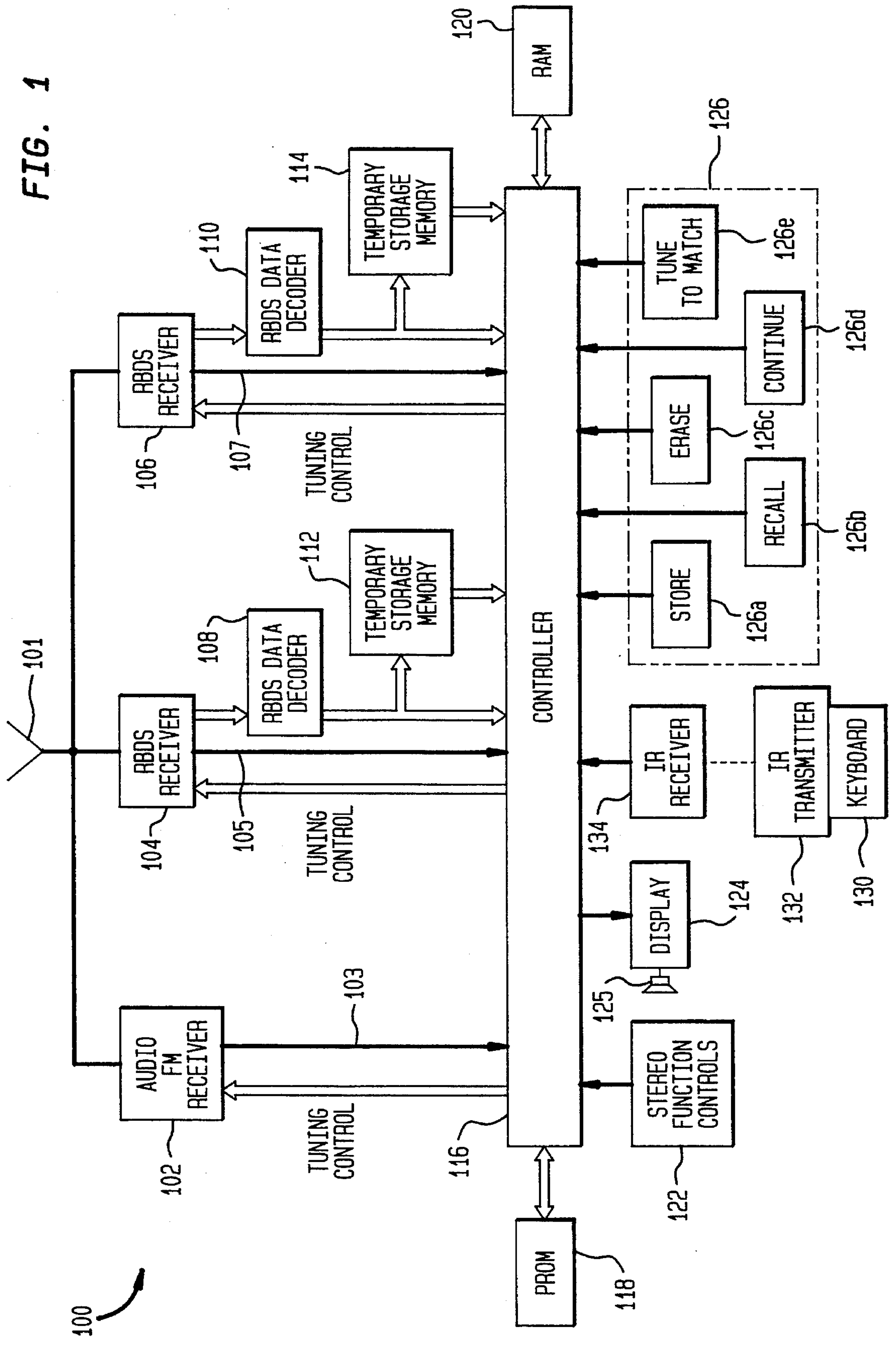
FIG. 1 is a block diagram of the RBDS receiving system according to the present invention.

Referring now to the drawings, and more particularly to FIG. 1, a block diagram of the RBDS receiving system is shown and referenced generally by numeral 100. For purposes of description, it will be assumed that receiving system 100 is an FM receiving system since RBDS is being introduced on the FM frequency band. However, it is to be understood that the present invention may be adapted to work with other broadcasting frequency spectrums (e.g., AM) that adopt RBDS as part of their normal broadcast format.

Receiving system 100 consists of: audio FM receiver 102, RBDS receivers 104 and 106, RBDS data decoders 108 and 110, temporary storage memories 112 and 114, microprocessor based controller 116 interfaced with programmable read only memory (PROM) 118, non-volatile random access memory (RAM) 120, stereo function controls 122, display 124, and RBDS function controls 126. System 100 also includes keyboard 130 for accepting user supplied match criteria as will be explained further below. As shown, system 100 can optionally include remote control capability in which case keyboard 130 is interfaced with infrared (IR) transmitter 132 communicating with IR receiver 134 interfaced with controller 116. It is to be understood that additional components of a typical FM receiving system (e.g., amplifier, audio controls, etc.) would normally be present to operate with receiving system 100. Such components have been simplified or omitted from the drawings and description as these aspects are well understood in the art and need not be discussed herein. Accordingly, relationships between elements in FIG. 1 are restricted to their RBDS roles.

Audio FM receiver 102 is the standard audio portion of an FM receiver which typically includes an RF preamp, local oscillator, IF stages, FM discriminator, AF amplifier, tone and volume controls, but not tuning controls. Each of RBDS receivers 104 and 106 is also a standard FM receiver with its pilot frequency set to the RBDS subcarrier frequency of 57 kHz. No audio or tuning controls need be provided on either of RBDS receivers 104 and 106.

Each of RBDS data decoders 108 and 110 typically contains serial-to-parallel converters and other circuitry necessary to convert an incoming RBDS data stream to a format usable by other interfacing blocks, i.e., controller 116 and memories 112 and 114, respectively. The particular circuitry provided by decoders 108 and 110 will be dependent chiefly upon the ultimate format of the RBDS data stream and the choice of microprocessor(s) within controller 116. Temporary storage memories 112 and 114 can be implemented by any one of a variety of storage devices such as first-in, first-out (FIFO) memory devices, addressable registers, etc. Preferably, memories 112 and 114 are FIFO memory devices owing to their simplicity of control.

Controller 116 is typically one or more conventional microcontrollers that can be suitably interfaced with the connected peripherals, i.e., audio FM receiver 102, RBDS receivers 104 and 106, etc. PROM 118 contains the program code for operating controller 116. RAM 120 is used for long-term storage of RBDS data.

Stereo function controls 122 include tuning controls for audio FM receiver 102. These controls can include, but are not limited to, a manual tuning adjustment, a set of preprogrammed frequency stops, standard FM "seek and scan" controls, and programmable station select controls. Keyboard 130 is operated by the user to input match criteria used by the present invention. If system 100 is to have remote control capability, the match criteria is transmitted to controller 116 via IR transmitter/receiver 132/134.

Display 124 is typically an alphanumeric display used to display any or, if size permits, all information required by the user, e.g., current listening station, time, prompts for user input, indication that a match has been found, RBDS data, etc. RBDS function controls 126 (e.g., pushbuttons) are used to control the functions associated with the RBDS portions of the invention to include store control **126*a*, recall control 126*b*, erase control 126*c*, continue control 126*d*, and tune-to-match control 126*e***.

In operation, antenna 10 picks up FM broadcast transmissions. When a station is selected via stereo function controls 122, controller 116 converts the control signals to tuning control signals in a format usable by audio FM receiver 102 and a format usable by RBDS receivers 104 and 106. The tuning control signals are sent from controller 116 to audio FM receiver 102 and one of RBDS receivers 104 and 106. More specifically, when power is first turned on, one RBDS receiver is designated by controller 116 to function in a locked or tracking mode such that it is tuned to the same station as audio FM receiver 102. The other RBDS receiver is designated by controller 116 to function on its own in a scan mode. For purpose of illustration, it will be assumed that RBDS receiver 104 is initially operating in the tracking mode while RBDS receiver 106 is initially operating in the scan mode.

In this illustration, once a station frequency has been selected via controls 122, controller 116 clears memory 112 and tunes audio FM receiver 102 and RBDS receiver 104 to the selected frequency. FM carrier detect 103 from audio FM receiver 102 is used to indicate to controller 116 that the selected station frequency has been found. FM carrier detect 105 from RBDS receiver 104 may be ignored by controller 116 when RBDS receiver 104 is in the tracking mode. Alternatively, FM carrier detect 105 may be used for fine tuning in the case of station drift. When RBDS receiver 104 detects RBDS data, it is output to RBDS data decoder 108 where the RBDS data is converted to a format usable by controller 116 and memory 112. Controller 116 causes the RBDS data to be loaded in memory 112 and to be displayed on display 124. If the user wishes to store the RBDS data shown on display 124, store control **126*a* is activated which causes controller 116 to download the RBDS data from memory 112 into RAM 120. Once stored in RAM 120, the RBDS data may be recalled or erased via respective activation of recall control 126*b* and erase control 126*c***.

While RBDS receiver 104 is in the tracking mode, RBDS receiver 106 operates in the scan mode. In particular, controller 116 issues tuning control signals to RBDS receiver 106 that cause RBDS receiver 106 to search for RBDS data that matches the match criteria previously entered by the user at, for example, keyboard 130. Match criteria can include data for one or more categories of RBDS codes. For example, if a user wanted to know other stations currently broadcasting classical music, the user could supply match criteria for the Program Type Code to indicate the classical music code. Depending on the ultimate format of RBDS data, the code could be entered in the form of letters (e.g., "CLASS") or a numbered code corresponding to classical music. Another possibility is that the RBDS Radio Text Code contains-the artist's name and/or song title associated with the broadcast program. Accordingly, a user could provide match criteria such as the artist's name and/or particular song title. This information might be in the form of letters or a numbered code associated with the particular artist to avoid the problems associated with spelling.

With respect to the scan mode of operation, controller 116 issues tuning control signals that increment the tuning frequency of RBDS receiver 106 until carrier detect 107 is detected by controller 116. If RBDS data is present, the RBDS data is passed to controller 116 via RBDS data decoder 110. If controller 116 detects that no RBDS data is present, RBDS receiver 106 continues to the next frequency. If RBDS data is present, controller 116 checks the RBDS data for a match against the match criteria input to controller 116. If no match is found, RBDS receiver 106 continues scanning until a match occurs.

Whenever a match occurs between the user supplied match criteria and the RBDS data, a match signal along with the RBDS data are supplied to display 124. Depending on its size, display 124 can display just a portion of the RBDS data matching the supplied code data (e.g., type of music, artist, etc.) or all of the RBDS data associated with the broadcast frequency on which the match occurred. At a minimum, display 124 displays the broadcast frequency on which the match occurred and the fact that a match has occurred. Identification of a match can additionally or alternatively come in the form of an audio signal produced by speaker 125.

In addition, whenever a match occurs between the user supplied match criteria and the RBDS data, RBDS data decoder 110 begins loading the RBDS data into memory 114 until one of the following three events occurs:

1) A pre-set time period elapses without user input at RBDS function controls 126. When this happens, controller 116 clears memory 114 and continues issuing tuning control signals to RBDS receiver 106 to maintain RBDS receiver 106 in the scan mode to search for another match.

2) The user decides not to change the operating frequency of audio FM receiver 102 based on the match by activating continue control 126*d*. When this happens, controller 116 clears memory 114 and continues issuing tuning control signals to RBDS receiver 106 to maintain RBDS receiver 106 in the scan mode to search for another match.

3) The user decides to change the operating frequency of audio FM receiver 102 to the frequency on which the match was found by activating tune-to-match control 126*e*. When this happens, controller 116 issues tuning control signals to audio FM receiver 102 to re-tune receiver 102 to the frequency on which the match was found. At the same time, RBDS receiver 106 switches to the tracking mode, i.e., remains tuned to the same frequency on which the match was found. The RBDS data associated with the frequency on which the match was found is loaded into memory 114 and displayed on display 124. This RBDS data may then be stored by the user in RAM 120 as described above. Simultaneously, RBDS receiver 104 is switched to the scan mode, i.e., RBDS receiver 104 receives tuning control signals from controller 116 that increment its tuning frequency until carrier detect 105 is detected by controller 116.

Tune-to-match control 126*e* can be configured to require activation with each match. Alternatively, tune-to-match control 126*e* can be configured to be automatically activated upon the occurrence of a match, i.e., the tuning configuration of system 100 changes automatically on the occurrence of a match.

To summarize, upon the automatic or manual acceptance of a match, audio FM receiver 102 is re-tuned to the broadcast frequency associated with the match while RBDS receivers 104 and 106 swap functions as controlled by controller 116. Each RBDS receiver can operate in a locked or tracking mode to track with audio FM receiver 102 or a scan mode searching each frequency of the FM band for the user supplied match criteria.

Figure 2:
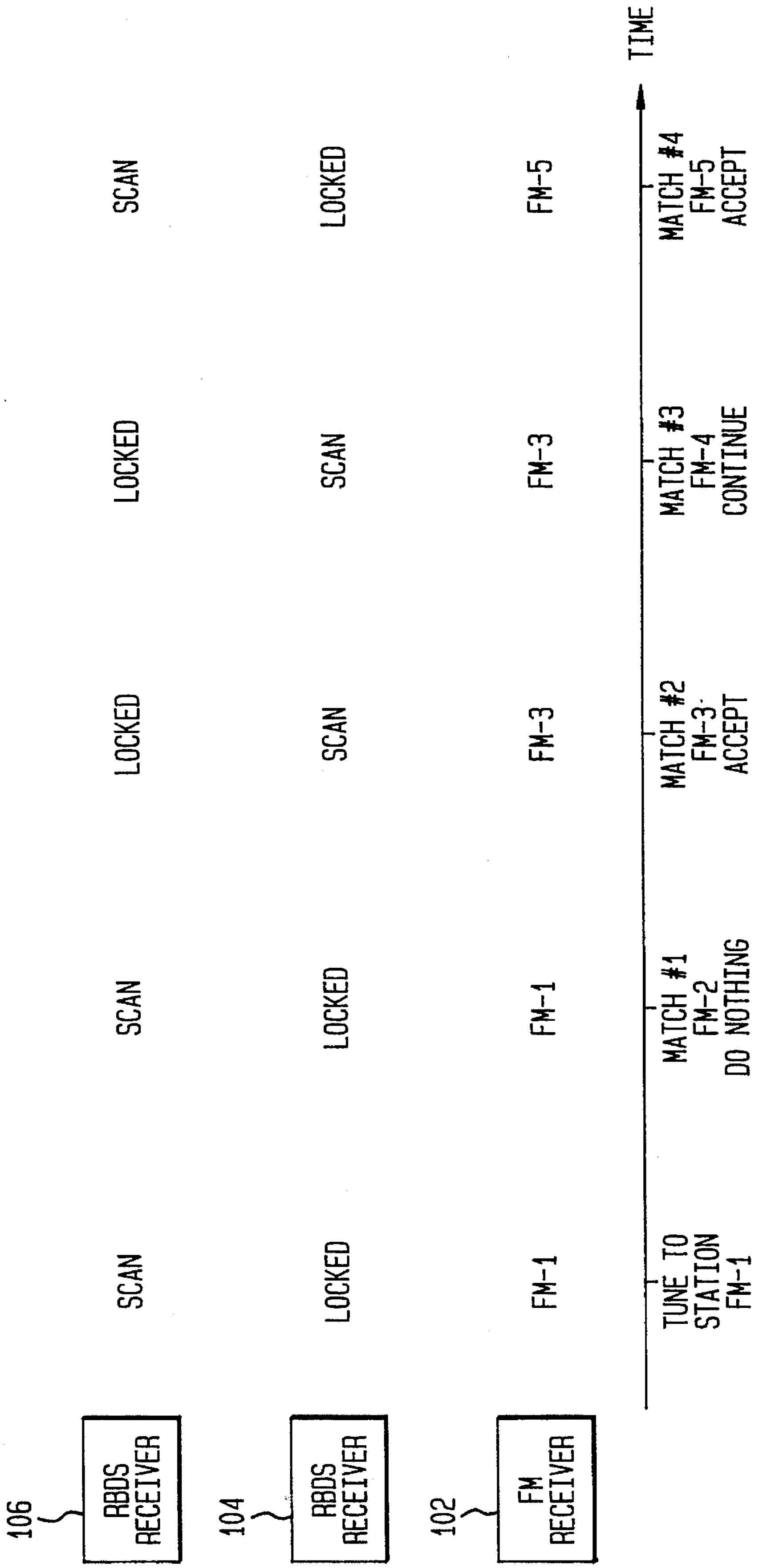
FIG. 2 is a time line flow diagram depicting the operation of the receiving system in accordance with the present invention.

To provide a clearer view of the operation of the present invention, the time line flow diagram of FIG. 2 is provided. Points on the time line indicate times when a match has occurred, the broadcast on which the match occurred and the user selected option. Above the time line, the broadcast frequency of FM receiver 102 is provided as well as the mode of operation for each of RBDS receivers 104 and 106. Initially audio FM receiver 102 is tuned to FM-1, RBDS receiver 104 is locked in the tracking mode to track the RBDS data signal associated with FM-1, and RBDS receiver 106 is in the scan mode to search for user supplied match criteria. At a later point in time, a first match is found in the RBDS data associated with the broadcast frequency FM-2. Since the user does nothing, the configuration of all three receivers remains the same. However, when a second match is found on broadcast frequency FM-3, the user accepts the match causing audio FM receiver 102 to be re-tuned to FM-3 while RBDS receiver 104 and 106 switch their respective modes. At the third match on broadcast frequency FM-4, the user opts to activate the continue control. Since there is no acceptance of the match, all three receivers retain their previous configuration. At the fourth match on broadcast frequency FM-5, the user again accepts the match causing the receivers to be reconfigured as shown.

The advantages of the present invention are numerous. A simple RBDS compatible receiving method and system provide a user with the capability to listen to one program while simultaneously searching for other programs of interest based on RBDS codes. The method and system will find immediate utility in the radio broadcast field as RBDS is implemented.

Although the invention has been described relative to a specific embodiment thereof, there are numerous variations and modifications that will be readily apparent to those skilled in the art in the light of the above teachings. It is therefore to be understood that, within the scope of the appended claims, the invention may be practiced other than as specifically described.

What is claimed as new and desired to be secured by Letters Patent of the United States is:

1. A receiver for operating within a broadcast frequency spectrum, said frequency spectrum defined by a plurality of broadcast frequencies having a subcarrier frequency for carrying a Radio Broadcast Data System (RBDS) digital signal, said receiver comprising:

a broadcast receiver having function controls activated by a user to selectively tune said broadcast receiver to a selected broadcast frequency in said frequency spectrum;

first and second RBDS receivers, one of said first and second RBDS receivers operating in a locked mode to receive said subcarrier frequency associated with said selected broadcast frequency, and one of said first and second RBDS receivers operating in a scanning mode to scan each said subcarrier frequency associated with each of said plurality of broadcast frequencies;

match criteria entry means activated by the user for inputting match criteria corresponding with at least one categorical portion of said RBDS digital signal;

a controller operatively coupled to said broadcast receiver, said match criteria entry means and said first and second RBDS receivers, said controller being provided with said match criteria, said controller comparing said match criteria with said RBDS digital signal associated with each of said broadcast frequencies scanned by said one of said first and second RBDS receivers operating in said scanning mode, said controller further generating a match signal every time a match occurs between said match criteria and said at least one categorical portion of said RBDS digital signal associated with one of said plurality of broadcast frequencies being scanned by said one of said first and second RBDS receivers operating in said scanning mode;

means, operatively coupled to said controller and responsive to said match signal, for identifying said one of said plurality of broadcast frequencies said every time a match occurs; and manually operated entry means operatively coupled to said controller, said manually operated entry means activated by the user for generating a switch control command, said controller (i) switching said broadcast receiver from said selected broadcast frequency to said one of said plurality of broadcast frequencies, (ii) switching one of said first and second RBDS receivers operating in said locked mode to said scanning mode, and (iii) switching said one of said first and second RBDS receivers operating in said scanning mode to said locked mode, only when both of said switch control command and said match signal are present.

2. A receiver as in claim 1 further comprising:

short-term memory storage operatively coupled to said first and second RBDS receivers for storing data carried by said RBDS digital signal associated with said selected broadcast frequency;

long-term memory storage operatively coupled to said short-term memory storage via said controller;

manually operated transfer means operatively coupled to said short-term and said long-term memory storage via said controller, said manually operated transfer means activated by said user for generating a transfer control command, said controller being responsive to said transfer control command for transferring said data from said short-term memory storage to said long-term memory storage.

3. A receiver as in claim 2 wherein said short-term memory storage comprises first-in, first-out type memory storage.

4. A receiver as in claim 2 wherein said long-term memory storage comprises non-volatile, random access type memory storage.

5. A receiver as in claim 2 wherein said means for identifying comprises a display device, said receiver further comprising manually operated retrieval means activated by said user for generating a retrieve control command, said controller being responsive to said retrieve control command for transferring selected portions of said data from said long-term memory storage to said display device.

6. A receiver as in claim 1 wherein said means for identifying comprises a visual display.

7. A receiver as in claim 1 wherein said means for identifying comprises an audio system.

8. A receiver as in claim 1 wherein said means for identifying comprises a visual display and an audio system.

9. A method for receiving a broadcast frequency spectrum in which each of a plurality of broadcast frequencies has a subcarrier frequency for carrying a Radio Broadcast Data System (RBDS) digital signal, said method comprising the steps of:

providing a broadcast receiver tuned to a selected broadcast frequency in said frequency spectrum;

providing first and second RBDS receivers having pilot frequencies set to said subcarrier frequency;

operating one of said first and second RBDS receivers in a locked mode to receive said subcarrier frequency associated with said selected broadcast frequency;

operating one of said first and second RBDS receivers in a scanning mode to scan each said subcarrier frequency associated with each of said plurality of broadcast frequencies;

providing match criteria corresponding with at least one categorical portion of said RBDS digital signal;

comparing said match criteria with said RBDS digital signal associated with each of said plurality of broadcast frequencies scanned by said one of said first and second RBDS receivers operating in said scanning mode;

generating a match signal every time a match occurs between said match criteria and said at least one categorical portion associated with one of said plurality of broadcast frequencies being scanned by said one of said first and second RBDS receivers operating in said scanning mode;

switching i) said broadcast receiver from said selected broadcast frequency to said one of said plurality of broadcast frequencies, ii) one of said first and second RBDS receivers operating in said locked mode to said scanning mode, and iii) said one of said first and second RBDS receivers operating in said scanning mode to said locked model only if said match signal has been generated.

10. A method according to claim 9 further comprising the step of identifying said one of said plurality of broadcast frequencies said every time a match occurs.

11. A method according to claim 10 wherein said step of identifying comprises the step of visually displaying a representation of said one of said plurality of broadcast frequencies said every time a match occurs.

12. A method according to claim 10 wherein said step of identifying comprises the step of issuing an audible report said every time a match occurs.

13. A method according to claim 10 wherein said step of identifying comprises the steps of:

visually displaying a representation of said one of said plurality of broadcast frequencies said every time a match occurs; and issuing an audible report said every time a match occurs.

14. A method according to claim 9 further comprising the step of providing a switch control command, wherein said step of switching only occurs when both of said switch control command and said match signal are present.

* * * * *